(12) United States Patent
Von Heynitz

(10) Patent No.: US 12,239,951 B2
(45) Date of Patent: Mar. 4, 2025

(54) APPARATUS AND METHOD FOR PROMOTING REACTION IN FLUID MEDIA

(71) Applicant: Technische Universität München, Munich (DE)

(72) Inventor: Christian Von Heynitz, Munich (DE)

(73) Assignee: Technische Universität München, Munich (DE)

(*) Notice: Subject to any disclaimer, the term of this patent is extended or adjusted under 35 U.S.C. 154(b) by 677 days.

(21) Appl. No.: 17/413,876

(22) PCT Filed: Nov. 20, 2019

(86) PCT No.: PCT/EP2019/081894
§ 371 (c)(1),
(2) Date: Jun. 14, 2021

(87) PCT Pub. No.: WO2020/126267
PCT Pub. Date: Jun. 25, 2020

(65) Prior Publication Data
US 2022/0062851 A1  Mar. 3, 2022

(30) Foreign Application Priority Data

Dec. 21, 2018 (EP) .................................... 18215196

(51) Int. Cl.
*B01J 19/18* (2006.01)
*B01F 27/116* (2022.01)
(Continued)

(52) U.S. Cl.
CPC ....... *B01J 19/1806* (2013.01); *B01F 27/1161* (2022.01); *B01F 27/95* (2022.01);
(Continued)

(58) Field of Classification Search
CPC ...... B01F 27/95; B01F 27/1161; B01F 35/55; B01F 35/7162; B01J 19/0066; B01J 19/1806; B01J 19/1868
(Continued)

(56) References Cited

U.S. PATENT DOCUMENTS 171,832 A * 1/1876 McIntyre ................ B01F 27/95
475/11
1,200,250 A * 10/1916 Sinding-Larsen .... B01F 27/091
416/111
(Continued)

FOREIGN PATENT DOCUMENTS

WO  2015050491 A1  4/2015
WO  2015126291 A1  8/2015

OTHER PUBLICATIONS

Hendrik Mallin et al.: "Efficient Biocatalysis with Immobilized Enzymes or Encapsulated Whole Cell Microorganism by Using the SpinChem Reactor System", CHEMCATCHEM, vol. 5, No. 12, Oct. 11, 2013, pp. 3529-3532.
(Continued)

*Primary Examiner* — Charles S Bushey
(74) *Attorney, Agent, or Firm* — Grossman, Tucker, Perreault & Pfleger, PLLC

(57) ABSTRACT

An apparatus for promoting a mass transfer reaction having a flow distributor and a drive unit. The flow distributor has a top end surface, a bottom end surface and a peripheral surface that are axisymmetric with respect to a rotation axis. The flow distributor is configured to submerge in a fluid medium and to generate a flow of the fluid medium through at least one of the top end surface and the bottom end surface and through the peripheral surface by rotating around the rotation axis. The drive unit is configured to move the flow distributor perpendicular to the rotation axis.

19 Claims, 10 Drawing Sheets

(51) Int. Cl.
  *B01F 27/95*     (2022.01)
  *B01F 35/00*     (2022.01)
  *B01F 35/71*     (2022.01)
  *B01J 19/00*     (2006.01)

(52) U.S. Cl.
  CPC .......... *B01F 35/55* (2022.01); *B01F 35/7162* (2022.01); *B01J 19/0066* (2013.01)

(58) Field of Classification Search
  USPC ..................................................... 261/83, 91
  See application file for complete search history.

(56) References Cited

U.S. PATENT DOCUMENTS

| | | | | |
|---|---|---|---|---|
| 1,929,470 | A * | 10/1933 | Ballard | B01F 27/96 261/93 |
| 2,115,742 | A * | 5/1938 | Newton | B01F 27/95 475/11 |
| 2,935,495 | A | 5/1960 | Kennedy | |
| 3,407,046 | A * | 10/1968 | Massoubre | B01F 27/94 422/135 |
| 4,068,832 | A * | 1/1978 | Blaetz | A23G 3/0221 99/452 |
| 4,132,484 | A * | 1/1979 | Kimmel | B01F 27/951 366/288 |
| 4,589,782 | A * | 5/1986 | Park | G01N 5/00 374/14 |
| 5,108,711 | A * | 4/1992 | Chszaniecki | B29C 48/44 422/135 |
| 2002/0132353 | A1 | 9/2002 | Tamura et al. | |

OTHER PUBLICATIONS

International Search Report and Written Opinion dated Dec. 13, 2019, issued in related applciation No. PCT/EP2019/081894.
https://www.spinchem.com/, mentioned in invention disclosure, initially accessed on Oct. 18, 2018.

* cited by examiner

APPARATUS AND METHOD FOR PROMOTING REACTION IN FLUID MEDIA

TECHNICAL BACKGROUND

Some mass transfer processes are preferably performed via mass transfer between a fluid medium and one or more solid reactants. For example, the solid reactant may be brought into contact with the fluid medium by means of a convective flow to perform the mass transfer between the fluid and solid phases. According to some examples, the fluid medium is transited, percolated or circulated through a packed reservoir containing the solid reactant.

Some transformation processes may require replenishing the solid reactants, exchanging or adding new solid reactants, removing by-products and/or isolating target products. Moreover, the transformation may be performed in a batch reactor, with the solid particulate reactant being suspended directly in the fluid medium and stirred. If so, a separation of the solid reactant, its remainder and/or a by-product from the fluid product may be necessary, for example by filtration or sedimentation. Such processes may be performed in a batch reactor employing for example valves and pumps for establishing a flow system of the fluid medium through the solid reactant reservoir. Furthermore, the mass transport rate may be unsatisfactory in a case that the solid phase material is carried along with the flow of the liquid phase material, thereby impairing the relative movement between the different materials.

SUMMARY OF THE INVENTION

Disclosed herein is an apparatus for promoting a mass transfer reaction. The apparatus comprises a flow distributor and a drive unit. The flow distributor has a top end surface, a bottom end surface and a peripheral surface. The peripheral surface spans between the top end surface and the bottom end surface. The top end surface, the bottom end surface and the peripheral surface are axisymmetric with respect to a rotation axis. The flow distributor is configured to submerge in a fluid medium and to generate a flow of the fluid medium through at least one of the top end surface and the bottom end surface, and through the peripheral surface by rotating around the rotation axis. The drive unit is configured to move the flow distributor perpendicular to the rotation axis.

The apparatus described herein may allow for generating a flow of the fluid medium through a containment of the solid reactant in an effective manner in terms of throughput of the flow and net surface contact between the different phases. Hence, the rate of the mass transfer reaction, e.g. by diffusion, adsorption, absorption, extraction or the like, between the fluid medium and the solid reactant may be positively affected.

Moreover, the apparatus described herein may operate to generate the circulation of the fluid medium through the containment of the solid reactant and at the same time act as a reactor in which the mass transfer reaction takes place. Hence, the apparatus may promote the mass transfer reaction without requiring an additional flow system comprising additional valves, pumps and pipeworks for controlling circulation, transition or percolation of the fluid medium through the containment of the solid reactant.

In addition, the apparatus described herein may allow for dynamically modifying the flow of the fluid medium through the flow distributor. The flow distributor may be moved such as to increase the throughput of flow of the fluid medium through the flow distributor. Accordingly, the apparatus may allow for optimizing the use of the flow distributor.

In particular, the rotation of the flow distributor around the rotation axis may give rise to a pressure differential and/or inertial forces directed radially outwards with respect to the rotation axis. As a result, the solid reactant may be pushed towards the peripheral surface. In the course of a static rotation of the flow distributor, the solid reactant may further agglomerate or lose its physical integrity and spread across the peripheral surface. The agglomeration may occur, for example, if the solid reactant is particulate matter having a diameter in a micron or submicron range. The loss of the physical integrity may occur in particular when the solid reactant is a soft material, such as a biological and/or organic substance. The apparatus described herein may be configured to move the flow distributor perpendicular to the rotation axis so that the radial forces acting on the solid reactant due to the rotation of the flow distributor around the rotation axis is at least partially compensated in terms of magnitude and/or in spatial terms. In particular, the solid reactant located on or in the vicinity of the peripheral surface may be carried along with the movement of the flow distributor. Accordingly, the movement of the flow distributor perpendicular to the rotation axis may give rise to a force component acting on the solid reactant in a direction corresponding to the movement of the flow distributor. In particular, the flow distributor may be moved such that the force component acting on the solid reactant is directed radially inwards, i.e. towards the rotation axis of the flow distributor. In this manner, the solid reactant may be pushed away from the peripheral surface of the flow distributor.

The apparatus described herein may be used for heterogeneous reactions for diverse fields of application for industrial, commercial and/or scientific purposes. For example, the apparatus may be used for mass transfer reactions in the fields of chemistry, chemical engineering, biology, biotechnology, physics, environment technology, mechanical engineering, material processing, food or beverage processing. The apparatus may be applicable for mass transfer reactions not only between a fluid medium and solid reactants, but also between multiple fluid substances.

In the present disclosure, unless otherwise indicated, terms indicating a direction, plane or orientation of the structural and functional features refer to the axial symmetry of the top end surface, the bottom end surface and the peripheral surface of the flow distributor. Accordingly, the expressions axial, radial and tangential refer to the axial symmetry with respect to the rotation axis of the flow distributor, unless otherwise indicated.

The flow distributor may have an axisymmetric body formed at least partially by the top end surface, the bottom end surface and the peripheral surface. The shape of the body of the flow distributor may be at least partially cylindrical, conical, ellipsoidal, spherical, spheroid or a combination thereof. The body of the flow distributor may be at least partially hollow so as to provide a flow passage for the fluid medium and/or to house the solid reactant.

The peripheral surface of the flow distributor may refer to a wall arranged circularly around the rotation axis. The peripheral surface may also be referred to as a lateral surface, peripheral wall or lateral wall. The peripheral surface may have an axisymmetric, in particular ring-shaped, cross section in a plan view in the axial direction, and an annular shape as a whole. The shape and dimension of the circular cross section may be constant along the axial direction and the flow distributor may have a substantially cylindrical shape. Alternatively or additionally, for example in a section, the radius of the circular cross section may vary along the axial direction.

The peripheral surface may comprise a plurality of openings for the fluid medium to flow through. The peripheral surface may be solid in the remaining portion apart from the plurality of openings, therefore being impermeable for the fluid medium. The plurality of openings in the peripheral surface may be configured so as to be impermeable for the solid reactants. For example, the plurality of openings may be provided as a mesh with a lattice spacing smaller than the size of the solid reactants. The plurality of openings may be distributed over the peripheral surface. For example, the plurality of openings may be grouped in multiple groups of openings and distributed over the peripheral surface, wherein the groups are distanced from one another by a respective solid portion of the peripheral surface. Further, each group may have a particular geometric shape, such as a circular shape, a polygonal shape, a linear shape or the like or any combination thereof. Accordingly, the openings may be provided according to a predetermined pattern, which may contribute to generating an inhomogeneous flow of the fluid medium during the operation of the flow distributor.

In some examples, the peripheral surface may include a mesh sheet in the shape of a lateral surface of an axisymmetric body spanning between the bottom end surface and the top end surface. The flow distributor may further comprise a frame to which the mesh sheet may be fixed. The frame may have open areas such that the fluid medium can flow through the mesh sheet. The frame may be made of a single piece having, for example, grooved portions to insert the mesh sheet. Alternatively, the frame may be assembled from multiple parts enclosing the mesh sheet. The frame of the flow distributor may connect the bottom end surface and the top end surface. Unless otherwise indicated, the expression of a gear or a shaft being fixed may refer to the same being stationary at a fixed position during the operation of the apparatus. In particular, a fixed gear or shaft may be prevented from a translational movement in radial direction. At the same time, the rotational movement of the respective gear or shaft may not be affected.

Any of the bottom end surface and the top end surface may be a wall or a plate. The top end surface and/or the bottom end surface may have a flat portion to be arranged perpendicular to the rotation axis during operation of the flow distributor. Additionally or alternatively, at least one of the top end surface and the bottom end surface may have a curved portion, a stepped portion, a grooved portion, a recessed portion or a projecting portion or a combination thereof.

Any of the bottom end surface and the top end surface may be locally permeable to the fluid medium. For example, the bottom end surface and/or the top end surface of the flow distributor may have one or more openings for the fluid medium to pass through. In particular, the bottom end surface and/or the top end surface may have one opening in a radially central portion in a plain view along the rotation axis. In particular, the radially central portion may refer to an area adjacent and around the rotation axis. For example, one opening may be formed having a circular cross section around the rotation axis of the flow distributor. Alternatively or additionally, the bottom end surface and/or the top end surface may have several openings concentrated in the respective central portion.

Moreover, in examples where the bottom end surface and/or the top end surface comprises an opening in the respective central position, the flow distributor may further comprise an inner peripheral surface that extends between the bottom end surface and the top end surface. The inner peripheral surface may be arranged radially inside the peripheral surface and may be arranged such to surround the one or more openings formed in the bottom end surface and/or the top end surface in a plain view along the axial direction. The inner peripheral surface may be arranged parallel to and around the rotation axis of the flow distributor. The inner peripheral surface may have an axisymmetric e.g. annular, shape with respect to the rotation axis of the flow distributor. The inner peripheral surface may have a plurality of openings to allow the fluid medium to flow through. The openings of the inner peripheral surface may be sized, e.g. have a lattice spacing, such to be impermeable to the solid reactant. For example, the inner peripheral surface comprises a mesh sheet in the shape of a lateral surface of an axisymmetric body spanning between the bottom end surface and the top end surface, with the mesh sheet having a lattice spacing smaller than the size or diameter of a particulate solid reactant. Accordingly, it may be possible to contain or arrange the solid reactant between the inner peripheral surface and the peripheral surface.

The rotation of the flow distributor may establish a radial force due to a flow-induced pressure differential and/or an inertial force, such as the centrifugal force. With the flow distributor rotating around the rotation axis while being submerged in a fluid medium, friction between the fluid medium and the surfaces of the flow distributor may drag the fluid medium along the rotary motion of the flow distributor. The tangential speed and thus the dynamic pressure are higher at a radially outward location and a centrifugal force based on the inertia of the fluid medium arises. Hence, the fluid medium in the inside of the flow distributor may flow radially outwards through the peripheral surface of the flow distributor. The fluid medium may flow through the bottom end surface and/or the top end surface into the flow distributor. In total, the rotation of the flow distributor may cause the fluid medium to flow into the flow distributor through the bottom end surface and/or the top end surface and further to flow out of the flow distributor through the peripheral surface.

In some examples, the flow distributor may further comprise at least one barrier member arranged between the rotation axis and the peripheral surface. The at least one barrier member may be configured to transfer the rotation of the flow distributor around the rotation axis to the fluid medium in which the flow distributor is submerged. The at least one barrier member may extend in radial direction at least partially between the rotation axis and the peripheral surface, and in axial direction at least partially between the bottom end surface and the top end surface. The at least one barrier member may have any proper shape and may be arranged such to effectively transfer the rotation of the flow distributor to the fluid medium. In some examples, the at least one barrier member is plate-shaped or vane-shaped. In some examples, the at least one barrier member extends from the inner side of the peripheral surface towards the rotation axis of the flow distributor. In examples where the flow distributor comprises multiple barrier members, the barrier members may be identical or differ from one another in shape and/or dimension.

Furthermore, in examples where the flow distributor comprises an inner peripheral surface as described above, the at least one barrier member may extend axially from the bottom end surface to the top end surface and radially from the peripheral surface to the inner peripheral surface. Accordingly, the at least one barrier member may extend along a plane perpendicular to the tangential direction and circle around the rotation axis as the flow distributor rotates around the rotation axis. In examples where the flow distributor comprises multiple barrier members, the barrier members may divide the inner volume of the flow distributor into multiple compartments. Any of such compartments may be configured to house a respective solid reactant. In such examples, at least one of the compartments may be loaded with a first solid reactant, while another one of the compartment is loaded with a second solid reactant different from the first solid reactant.

The solid reactant may be maintained or trapped inside the flow distributor during the operation of the flow distributor. The mass transfer reaction between the fluid medium and the solid reactant may be promoted by the fluid medium coming into contact with, and moving relative to the solid reactant while flowing through the flow distributor.

The bottom end surface and/or the top end surface may be locally permeable for the fluid medium, and otherwise impermeable for a solid reactant. As mentioned above, one or more openings may be formed in the respective central portion of the bottom end surface and/or of the top end surface. In some examples, the flow distributor may comprise an inner peripheral surface with a lateral mesh sheet as described above. In other examples, the one or more openings of the bottom end surface and/or of the top end surface may be provided with a selective screening means, for example a mesh, a lattice or a filter, with a lattice spacing smaller than the dimension of a particulate matter of the solid reactant. In such examples, the solid reactant may be first loaded into the flow distributor before the flow distributor is rotated.

In some other examples, the bottom end surface and/or the top end surface may have openings such as to let through the solid reactant. Accordingly, the flow distributor may be submerged into a batch of the fluid medium and the solid reactant and/or the solid reactant may be added to the fluid medium after submerging the flow distributor in the fluid medium. The solid reactant may be loaded into the flow distributor in response to the rotation of the flow distributor and maintained inside the flow distributor due to the laws of fluid dynamics as described above.

The fluid medium may be any fluid material to be used in a mass transfer reaction. Examples of the fluid medium include any pure fluid, such as water or alcohol, any solution, any emulsion, any suspension or any dispersion in a fluid or any combination thereof. For example, the fluid medium may contain further reactants, further agents, interstage products or byproducts other than the solid reactant to be carried by a convective flow of the fluid medium.

The term mass transfer as used herein may refer to a process generating a diffusive and/or convective transport of matter, including elementary particles, between two different materials. While the materials between which a mass transfer is desired may generally be in any state of matter, some specific examples include the mass transfer between a fluid phase material and a solid phase material. Examples of the mass transfer reaction may include chemical, biological or physical reactions between materials, or separation of chemical components from a mixture. The mass transfer reaction may be driven by the gradient of chemical potential and/or thermodynamic gradients. The mass transfer reaction may be affected by a flow pattern of the fluid medium through the system of the solid reactant as well as by the diffusion properties between the fluid medium and the solid reactant. The mass transfer may further include extraction of an ingredient from a solid material to solve it in or mix it with a fluid material.

The solid reactant may be provided as particulate or granular material. Alternatively or additionally, the solid reactant may be provided in a packed system of smaller units of any size, for example beads or pellets. Examples of the solid reactant comprise immobilized chemical reagent, catalyst, scavenger, reaction support, trapping sorbent, immobilized biological materials, including cells and cell fragments. Further examples of the solid reactant comprise biological substance, organic substance, plant matter, animal matter or food.

The flow distributor may be configured so as to be axisymmetric with respect to the rotation axis. The rotation of the flow distributor may refer to a rotating motion of the flow distributor around an axis which runs through its center of mass, and/or its symmetric axis. The rotation may also be referred to as gyration or spin.

The top end surface, the bottom end surface and the peripheral surface being axisymmetric with respect to the rotation axis may refer to a circular shape or a circular ring-shape in a plain view along the rotation axis.

The expression of moving perpendicular to the rotation axis may refer to a translational movement of the flow distributor substantially parallel to a plane that is perpendicular to the rotation axis. The translational movement of the flow distributor may be along a predetermined path. In particular, the flow distributor may be moved periodically in a loop along a closed path.

In some examples, the drive unit may be further configured to drive the flow distributor to rotate around the rotation axis. Accordingly, the drive unit may both rotate the flow distributor around the rotation axis and at the same time move the flow distributor perpendicular to the rotation axis. Therefore, both movements may be performed in a combined manner. In other examples, the rotation of the flow distributor around the rotation axis and the movement of the flow distributor perpendicular to the rotation axis may be controlled separately.

In some examples, the drive unit may be configured to move the flow distributor such that the rotation axis of the flow distributor moves along a circular path. Generally, a rotation around a rotation axis may differ from a movement along a circular path around an axis. A movement along a circular path may be performed around an axis that does not intersect the center of mass or the symmetric axis of the flow distributor. The movement along a circular path may or may not be coupled with a rotation of the flow distributor around its own axis. The axis of the circular path may be located outside of the flow distributor. The axis of the circular path may be parallel to the rotation axis.

Further, the movement of the flow distributor along the circular path may be in a direction parallel or opposite to the rotation around the rotation axis. As discussed above, the movement of the flow distributor perpendicular to the rotation axis may allow for at least partially and locally compensating the radial force acting on the solid reactant, wherein the radial force is directed radially outwards due to the rotation of the flow distributor around the rotation axis. Thus, a force component may be generated that pushes the solid reactants off the peripheral surface. Furthermore, by moving the flow distributor along a circular path, a force component may be exerted that oscillates periodically according to a movement speed along the circular path. In particular, the oscillating force component may be separate from the rotation of the flow distributor around the rotation axis, and therefore contribute to effectively pushing the solid reactant off the peripheral surface.

In some examples, a counterweight may be provided to prevent the occurrence of an unbalance at the circular movement of the flow distributor. The counterweight may be provided as a single body or an arrangement of multiple bodies. For this purpose, number, mass and arrangement of the counterweight may be such to compensate the rotational inertia of the flow distributor with respect to the circular movement.

In some examples, the drive unit comprises a first gear, a second gear and an actuator. The first gear is arranged around a revolution axis. The second gear may mesh or engage with the first gear. Multiple gears engaging or meshing with one another may refer to their teeth being coupled such that tangential forces may be transferred from one to another. Unless otherwise indicated, the expressions meshing and engaging may be used interchangeably. The second gear is coupled to the flow distributor such to rotate the flow distributor around the rotation axis. In particular, the second gear may be arranged to rotate around (an axial extension of) the rotation axis of the flow distributor. The actuator may be configured to drive the first gear and/or the second gear. For example, the actuator may be configured to drive the first gear and the second gear by driving the first gear and thereby causing the second gear to move around the first gear. The first gear may be arranged in a non-movable manner in terms of translational movement perpendicular to the revolution axis.

In some examples, the second gear may be actively driven by the actuator to rotate around the first gear while rolling along the circular path around the revolution axis, thereby performing the rotation around the rotation axis of the flow distributor. For example, the drive unit may further comprise a gear carrier coupled to the second gear. The gear carrier may be configured to rotate around the revolution axis and thereby to move the second gear around the first gear. In such examples, the gear carrier may be actively driven to move the second gear around the revolution axis. At the same time, the first gear may be arranged to be rotatable without being actively driven, non-rotatable or driven by another actuator to rotate around the revolution axis.

In further examples, the first gear may be actively driven by the actuator. In such examples, the second gear may be not actively driven but arranged to move around the first gear in response to the revolution of the first gear. Alternatively, the second gear may be actively driven by another actuator, e.g. through a gear carrier as described above, to move along the circular path around the revolution axis.

In some examples, the drive unit may further comprise a ring gear arranged radially outside of the first and second gears. For example, the ring gear may be arranged to be non-rotatable, and the first gear may be actively driven to rotate around the revolution axis and/or the second gear may be actively driven to move around the revolution axis while rotating around the rotation axis. In further examples, the ring gear may be configured to be rotatable and actively driven by an actuator in addition to the first gear and/or the second gear being driven by the actuator in the above described manner.

In some examples, the drive unit may comprise a planetary gear having a centrally arranged sun gear and one or more planet gears arranged on a circumference of the sun gear. In such examples, the first gear may correspond to the sun gear, and the second gear may correspond to one of the one or more planet gears. The planetary gear may further comprise a ring gear and/or a gear carrier similar to those as described above. Alternatively or additionally, the drive unit may further comprise another planetary gear to drive two separate shafts to transmit a respective torque to the first gear and to the second gear.

In some examples, the drive unit may comprise a first actuator to drive the first gear to rotate around the revolution axis and a second actuator to drive the second gear to rotate around the rotation axis. The first actuator and the second actuator may operate differently from each other in terms of torque and/or rotation speed of rotation of the second gear around the rotation axis, a movement speed of the second gear around the revolution axis and/or a rotation speed of the first gear around the revolution axis. For example, the second actuator may drive the second gear to rotate with less than one to several thousand revolutions per minute. Further, the first actuator may drive the first gear to rotate with less than one to several thousand revolutions per minute. For example, the first and second actuators may operate such that the first gear rotates around the revolution axis with 0.1 to 10 times, in particular 0.2 to 2 times, as fast as the second gear rotates around the rotation axis.

Accordingly, the rotation around the rotation axis and the movement along the circular path may be coupled to each other or performed separately. The first actuator and/or the second actuator may be an electric motor. The combination of the first gear and the second gear may provide the rotation of the flow distributor around the rotation axis and the movement of the flow distributor along the circular path in a simple and cost-saving manner. Separately controlling the rotation and movement of the first gear and the second gear may contribute to effectively pushing the solid reactant away from the peripheral surface.

Additionally or alternatively, the flow distributor may be coupled to the drive unit through a friction-based connecting means. For example, wheels may be used instead of gears to transmit torque. In other examples, the torque may be transmitted through a belt.

In the following, the flow distributor may also be referred to as a first flow distributor. Accordingly, the rotation axis of the flow distributor may be referred to as a first rotation axis.

In some examples, the apparatus further comprises a second flow distributor. The second flow distributor may be configured to rotate around a second rotation axis. The second flow distributor may have a top end surface, a bottom end surface and a peripheral surface. The top end surface, the bottom end surface and the peripheral surface of the second flow distributor may be axisymmetric with respect to the second rotation axis. The second flow distributor may be arranged such that the second rotation axis is parallel to the first rotation axis. Furthermore, the second flow distributor may be arranged such that the second rotation axis is distanced from the first rotation axis. In such examples, the drive unit may be further configured to move the second flow distributor perpendicular to the second rotation axis. In particular, the drive unit may be configured to move the first flow distributor and the second flow distributor along a common circular path.

For example, the second flow distributor may have similar structural and functional features to the first flow distributor. In particular, the first and second flow distributors may be identical. Alternatively, the second flow distributor may differ from the first flow distributor in the general shape, in the dimensions of the top and bottom end surfaces and peripheral surface and/or in the lattice spacing of the openings in the bottom and top end surfaces and/or peripheral surface.

Accordingly, the apparatus may comprise at least two flow distributors that are coupled to and driven by a common drive unit. In further examples, the apparatus may comprise three, four or more flow distributors that are coupled to and driven by a common drive unit. The second flow distributor may be loaded with the same solid reactant as the first flow distributor or with another solid reactant different from that of the first flow distributor. Alternatively or additionally, one of the flow distributors may be used for filtering purpose. For example, one of the flow distributors may be loaded with a filtration membrane or porous particles for filtration. Accordingly, the usability of the apparatus may be diversified and the apparatus may allow for a diversification of the mass transfer reaction.

In some examples, the apparatus may further comprise a vortex breaker coupled to the drive unit and arranged radially outwards from the flow distributor with respect to the rotation axis. For example, the vortex breaker may be coupled to the shaft of the first gear and/or to a gear ring, if applicable. The vortex breaker may be arranged to rotate with the first gear, however with a rotation speed different from that of the first gear. In other examples, the vortex breaker may be arranged to be non-rotatable.

The vortex breaker may refer to a device configured to at least partially and at least locally reduce the tangential velocity of the fluid medium, therefore disturbing the formation of a static. Examples of a vortex breaker may include a vane, baffle or pillar protruding radially. A static vortex may decrease the flow of the fluid medium relative to the solid reactant and thus negatively affect the rate of the mass transfer reaction and reduce the yield of the desired product. Providing the vortex breaker may contribute to reducing the formation of static vortices, thereby further promoting the mass transfer reaction.

According to a further aspect of the present disclosure, an apparatus for promoting a mass transfer reaction comprises at least three flow distributors and a drive unit. Each of the at least three flow distributors may have a top end surface, a bottom end surface and a peripheral surface that are, for each of the at least three flow distributors, axisymmetric with respect to a respective rotation axis. Each of the at least three flow distributors may be configured to submerge in a fluid medium and to generate a flow of the fluid medium through at least one of the respective top end surface and the respective bottom end surface and through the respective peripheral surface by rotating around the respective rotation axis. The at least three flow distributors may be arranged so that the rotation axes of the at least three flow distributors are parallel to one another. The drive unit may be configured to move the at least three flow distributors along a common circular path. The common circular path may run perpendicular to the rotation axes of the at least three flow distributors.

Each of the at least three flow distributors may have structural and functional features similar to any of the first and second flow distributors as described above. The flow distributors may be loaded with the same solid reactant. Alternatively, at least two of the flow distributors may be loaded with a different solid reactant and/or an adsorbant, or any medium for filtering purpose. Accordingly, the usability of the apparatus may be diversified and the apparatus may allow for a diversification of the mass transfer reaction.

In some examples, two or more of any flow distributors described above may be altogether coupled to the drive unit via a planetary gear, which may be also referred to as an epicyclic gearing train. In such examples, any of the flow distributors may be moved perpendicular to the rotation axis by means of the planetary gear. The planetary gear may comprise multiple planet gears meshing or engaging with a central sun gear or with an outer gear ring. In such examples, each of the flow distributors may be coupled to a respective planet gear. For example, the flow distributors may be coupled to the center of the respective planet gear.

The planet gears may mesh or engage with a sun gear to receive the drive torque from an actuator. The sun gear may be centrally located and fixed. As the sun gear rotates, any of the planet gears may move along the periphery of the sun gear. In particular, the planet and sun gears may mesh or engage so that their pitch circles roll without slip. During operation, a point on the pitch circle of any of the planet gear may trace an epicycloid curve.

The planetary gear may comprise a fixed outer gear ring, ring gear or an annular gear instead of, or combined with a central sun gear. Any of the planet gears may roll on the inside of said gear ring. In such examples, the curve traced by a point on the pitch circle of any of the planet gears may be a hypocycloid. The planet gears may be coupled to a gear carrier. In such examples, the gear carrier may be driven to move the planet gears around the sun gear.

In some examples, the apparatus further includes a reactor vessel configured to contain a fluid medium and a reactant and to receive the flow distributor. In general, the reactant may be solid, liquid or gaseous. In such examples, the vessel may be dimensioned such that the rotation of the flow distributor around the rotation axis as well as the movement perpendicular thereto may be performed inside the vessel.

In particular, the vessel may be configured to receive and to contain both the first and second flow distributors as described above during the operation of the apparatus. Moreover, the vessel may be configured to receive and to contain all of the at least three flow distributors as described above during the operation of the apparatus. The operation of the apparatus may include the rotation of any of said flow distributors around the respective rotation axis and the movement of any of said flow distributors perpendicular to the respective rotation axis.

According to a further aspect, a method for promoting a mass transfer reaction is disclosed. The method comprises providing a flow distributor having a top end surface, a bottom end surface and a peripheral surface spanning between the top end surface and the bottom end surface, wherein the top end surface, the bottom end surface and the peripheral surface are axisymmetric with respect to a rotation axis. The flow distributor may be configured to submerge in a fluid medium. The flow distributor may be configured to generate a flow of the fluid medium through at least one of the top end surface and the bottom end surface and through the peripheral surface by rotating around the rotation axis. The flow distributor may have structural and functional features that are similar to any of the flow distributors described above.

In particular, the flow distributor may be moved perpendicular to the rotation axis R1 while the flow distributor is rotating around the rotation axis. The flow distributor may be moved basically in any direction that is perpendicular to the rotation axis. Moving the flow distributor may be intentionally performed using the drive unit and in particular may distinguish from a spontaneous movement due to the operation of the apparatus, for example due to an unbalance or a movement of the apparatus as a whole.

The method may further comprise loading a reactor vessel with a fluid medium; loading the flow distributor with at least one reactant; inserting the flow distributor in the reactor vessel; rotating the flow distributor around the rotation axis;

and moving the flow distributor perpendicular to the rotation axis. For example, the flow distributor may be moved along a circular path perpendicular to the rotation axis in addition to the rotation of the flow distributor around the rotation axis, similar as described above.

In examples where the flow distributor has multiple compartments separated from one another by barrier members as described above, the compartments may be loaded with the same solid reactant, or at least one compartment may be loaded with a solid reactant and another compartment may be loaded with another solid reactant.

The method may further comprise moving the flow distributor perpendicular to the rotation axis by means of a planetary gear. In particular, the flow distributor may be coupled to a planet gear of the planetary gear in the above described manner. Accordingly, the flow distributor may be operated to rotate around the rotation axis and at the same time to move along a circular path around a sun gear of the planetary gear.

The method disclosed herein may be applicable to the apparatus as described above and therefore provide similar or corresponding technical effects and advantages as described above in connection with the apparatus above. In particular, any of the above described structural and functional features may be also applicable to the operation of the flow distributor according to the method described herein. In particular, the method may allow for generating a flow of the fluid medium through a containment of the solid reactant in an effective manner in terms of throughput of the flow and net surface contact between the different phases. By this means, the rate of the mass transfer reaction between the fluid medium and the solid reactant may be positively affected.

Moreover, the method described herein may be applied to operate the apparatus described above. Hence, the method may allow for operating an apparatus for promoting a mass transfer reaction without requiring an additional flow system as discussed above.

DETAILED DESCRIPTION OF THE DRAWINGS

Figure 1A:
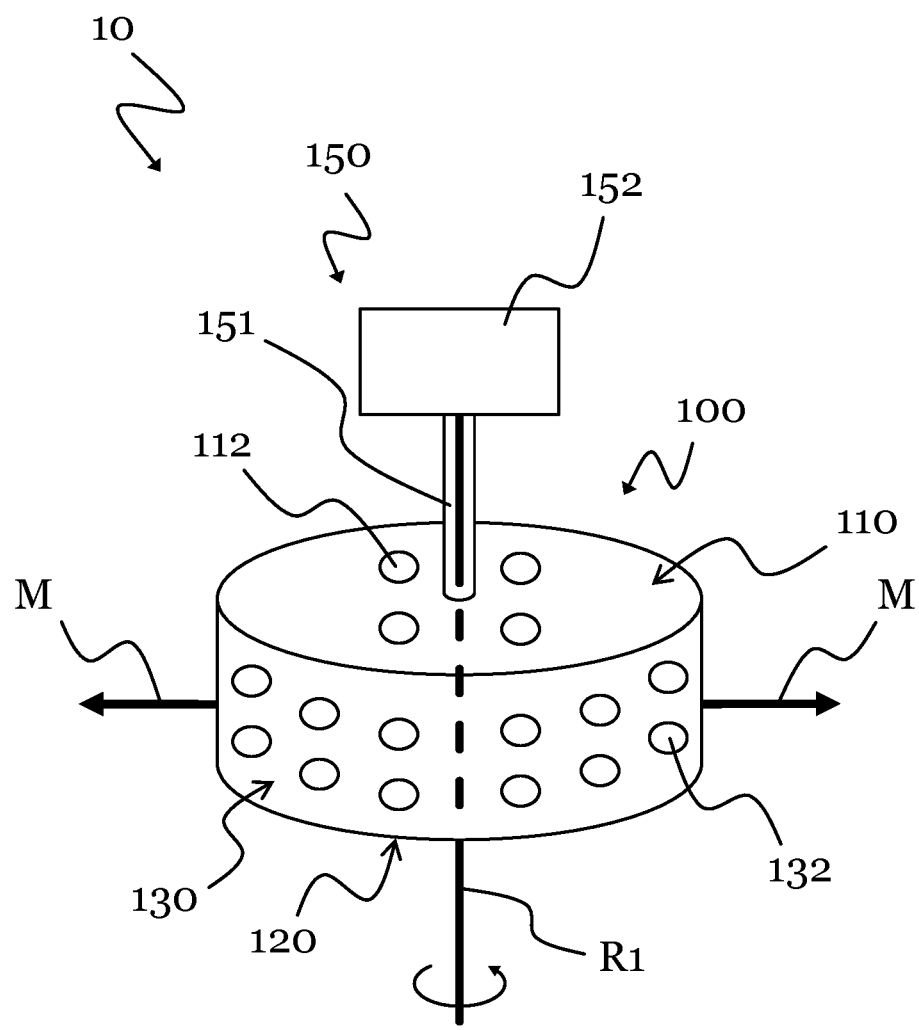
FIG. 1A is a schematic diagram of an apparatus in a perspective view according to an example.
Figure 1B:
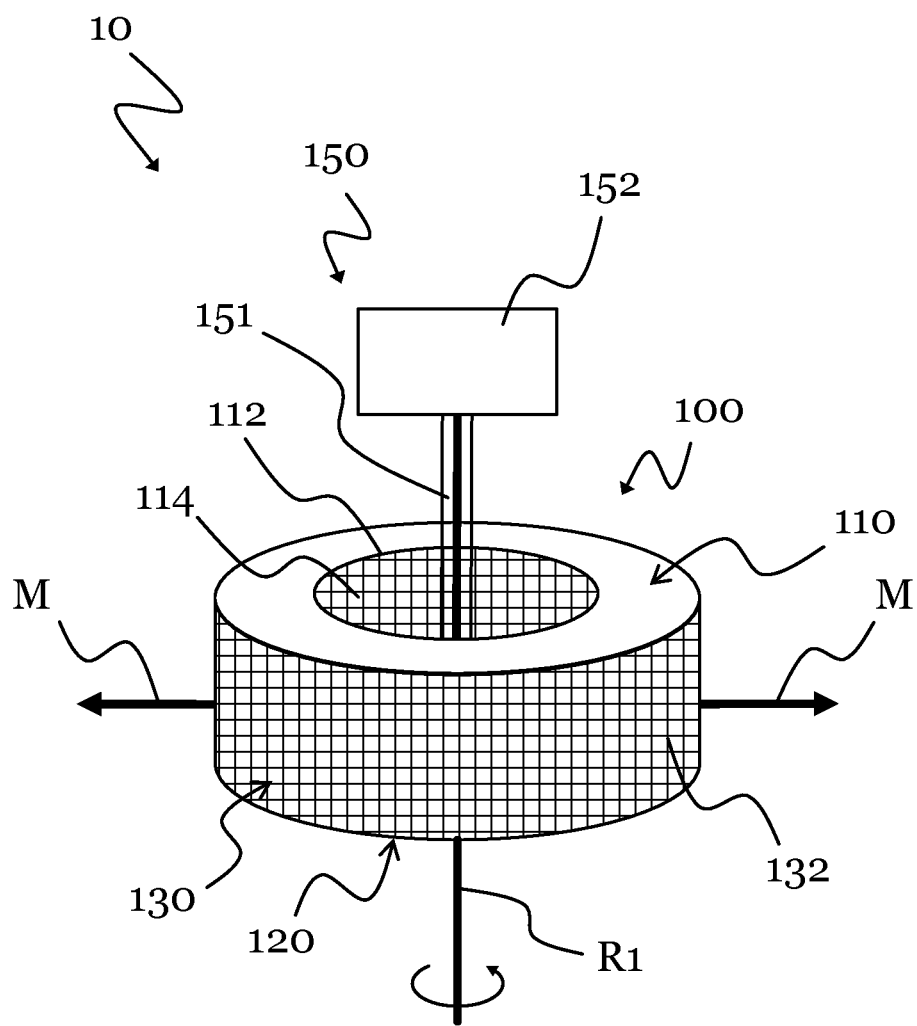
FIG. 1B is a schematic diagram of an apparatus in a perspective view according to a further example.

FIGS. 1A and 1B show two examples of an apparatus 10 comprising a flow distributor 100 and a drive unit 150. The flow distributor 100 has a top end surface no, a bottom end surface 120 and a peripheral surface 130 spanning between the top end surface no and the bottom end surface 120. The top end surface 110, the bottom end surface 120 and the peripheral surface 130 are axisymmetric with respect to a rotation axis R1. The flow distributor 100 is configured to submerge in a fluid medium (not shown) and to generate a flow of the fluid medium through the top end surface 110, the bottom end surface 120 and the peripheral surface 130 by rotating around the rotation axis R1. The fluid medium and the solid reactant housed by the flow distributor 100 may be as described above.

In the example of FIG. 1A, the top end surface 110 of the flow distributor 100 comprises openings 112 for the fluid medium to flow through. The openings 112 are concentrated in a radially central portion of the top end surface 110. The term radially central portion refers to an area in vicinity of the rotation axis R1. In some examples, the openings 112 may be provided with a mesh or a filter to maintain the solid reactant in the inside of the flow distributor 100 in the above described manner. In an alternative example as described above, the openings 112 may have no screening means for the solid reactants to pass through. The solid reactants may be contained in the inside of the flow distributor 100 during the operation of the flow distributor 100 by means of fluid dynamics and inertia-related forces.

Similarly, the bottom end surface 120 comprises openings, which are not shown in the perspective view of FIG. 1, for the fluid medium to flow through. These openings may be provided and configured in the manner as described above with reference to the top end surface 110.

The peripheral surface 130 comprises openings 132 in a manner corresponding to the top end surface 110 and/or the bottom end surface 120. The mesh or filter medium provided at the surfaces 110, 120 and 130 may have the same lattice spacing or be different from one another.

The flow distributor 100 may further comprise two, three or more barrier members formed in the inside in the above described manner. In such examples, the barrier members may contribute to establishing a flow of the fluid medium through the flow distributor 100 when the flow distributor 100 rotates around the rotation axis R1.

In the example shown in FIG. 1B, the top end surface 110 of the flow distributor 100 comprises one single opening formed in a central portion thereof. The flow distributor 100 in FIG. 1B further comprises an inner peripheral surface 114 arranged in the above described manner. In particular, the inner peripheral surface 114 is provided with a mesh sheet to prevent the solid reactant from passing through, thereby trapping the solid reactant between the top end surface 110, the bottom end surface 120, the peripheral surface 130 and the inner peripheral surface 114. The inner peripheral surface 114 is arranged parallel to the rotation axis R1 and the peripheral surface 130 and radially inside of the peripheral surface 130. The inner peripheral surface 114 extends axially from the top end surface 110 to the bottom end surface 120 and completely surrounds the rotation axis R1.

The drive unit 150 comprises an actuator 152 configured to generate a drive torque to rotate the flow distributor 100 around the rotation axis R1 and a rotation shaft 151 to transmit the drive torque to the flow distributor 100. The actuator 152 may be an electromotor of any known type. The drive unit 150 is configured to move the flow distributor 100 perpendicular to the rotation axis R1, as indicated by arrows M in the drawings.

The operation of the apparatus 10 regarding the rotation of the flow distributor 100 around the rotation axis R1 may be as described above. The rotation of the flow distributor 100 generates a flow of the fluid medium which the flow distributor is submerged in according to the laws of fluid dynamics, inertia forces and pressure differentials as described above. The rotation of the barrier members may further increase the flow of the fluid medium by the rotation of the flow distributor 100.

Figure 2:
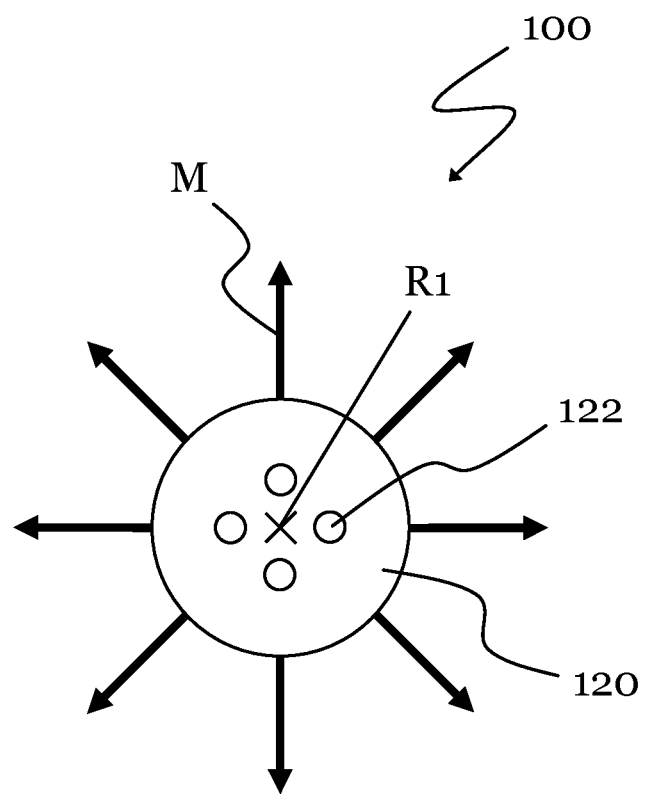
FIG. 2 is a schematic diagram of the flow distributor of FIG. 1 in a cross-sectional plain view.
Figure 3:
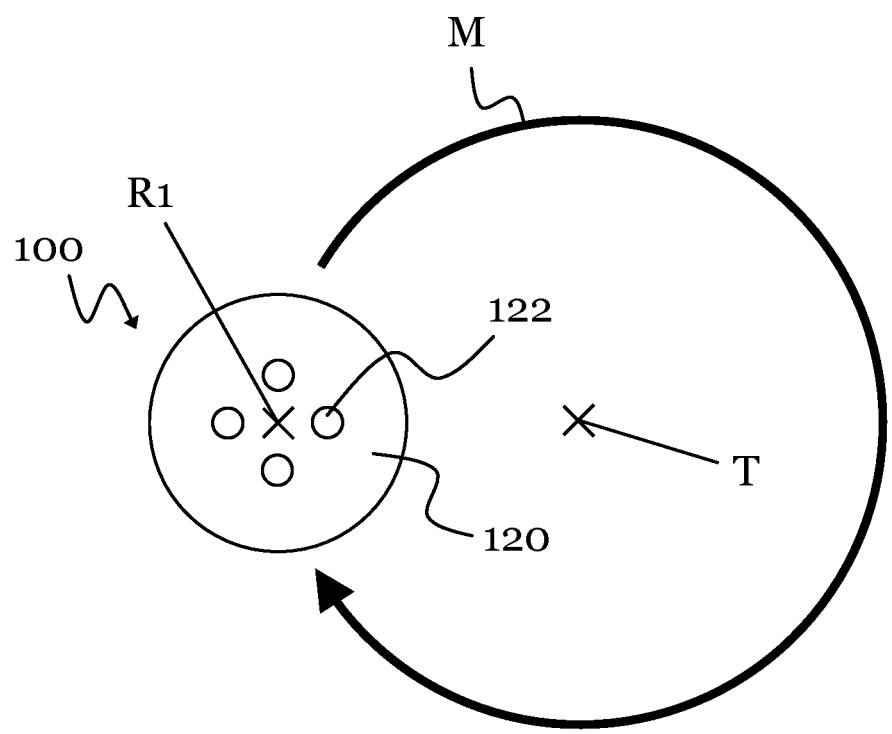
FIG. 3 is a schematic diagram of the flow distributor of FIG. 1 in a cross-sectional plain view according to an example.

The movement M of the flow distributor 100 in a direction perpendicular to the rotation axis R1 is further illustrated in detail in FIGS. 2 and 3. FIGS. 2 and 3 each show a cross-sectional view through the flow distributor 100 perpendicular to the rotation axis R1. As shown in FIG. 2, the movement M generally may be any direction that is perpendicular to the rotation axis R1. The movement M of the flow distributor 100 may be an intentionally performed movement using the drive unit 150. The movement M of the flow distributor 100 may in particular distinguish from a spontaneous movement due to the operation of the apparatus 10, for example due to an unbalance. In particular, the flow distributor 100 is moved while performing rotation around the rotation axis R1.

As shown in FIG. 3, the flow distributor 100 may be moved along a circular path. For example, the flow distributor 100 is moved along a circular path around a revolution axis T, along which the drive torque from the actuator 152 of the drive unit 150 is transmitted towards the flow distributor 100.

Figure 4:
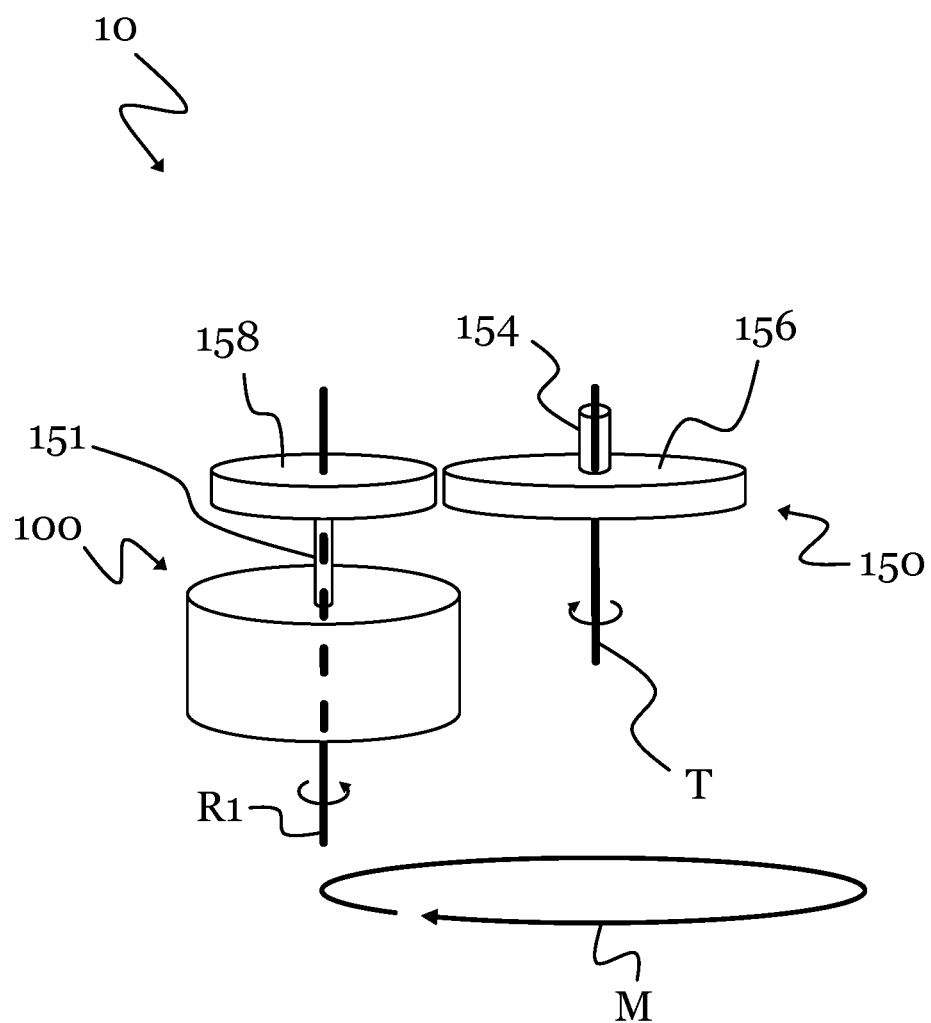
FIG. 4 is a schematic diagram of an apparatus according to an example.

In the example shown in FIG. 4, the drive unit 150 comprises a first gear 156, a second gear 158, the rotation shaft 151 and a revolution shaft 154. The rotation shaft 151 is coupled to the flow distributor 100 in the above described manner. The revolution shaft 154 is coupled to the first gear 156 to transmit torque to the first gear 156. Accordingly, the revolution shaft 154 and the first gear 156 may be actively driven to rotate along the revolution axis T, for example in a clockwise direction as depicted in FIG. 4. As will be described later with reference to FIG. 8, the drive unit 150 may further comprise a gear carrier and a gear ring to form a planetary gear.

The second gear 158 meshes with the first gear 156, receives torque and mechanical power from the first gear 156. The flow distributor 100 is coupled to the second gear 158 so that the rotation axis R1 of the flow distributor 100 superposes the revolution axis of the second gear 158. Accordingly, revolution of the second gear 158 causes the flow distributor 100 to rotate around the rotation axis R1.

Alternatively, the second gear 158 may be coupled to the actuator 152. Further, the second gear 158 may be coupled to a gear carrier (not shown in FIG. 4) that is configured to rotate around the revolution axis T, thereby moving the flow distributor wo around the first gear 156.

Further alternatively, both the first gear 156 and the second gear 158 may be driven by the actuator 152 and another actuator (not shown), respectively. The actuator 152 and the another actuator may operate to apply different rotation speeds to the first gear 156 and to the second gear 158. In further examples, a gear ring may be driven to rotate around the revolution axis T, as will be described below with reference to FIG. 8.

In FIG. 4 and further in FIG. 5 to 9, the first gear 156 and the second gear 158 are depicted in a disc-like shape for the sake of simplicity. It is understood that any of the gears that are illustrated in the drawings and described herein are provided according to the usual practice in the relevant art. In particular, parameters such as the number, profile and dimension of the teeth may be chosen properly as known from the art. Any of the gears described herein may also be referred to as a cogwheel.

In FIGS. 4 to 9, the openings 112, 132 are omitted for the sake of simplicity. It is noted that any of the flow distributors depicted in these drawings may have openings formed in any of the respective top end surface, bottom end surface and peripheral surface in the above described manner.

The first gear 156 may be immovably fixed. The revolution of the first gear 156 causes the second gear 158 to roll around the first gear 156. Accordingly, the second gear 158 moves around the first gear 156 while revolving. Consequently, the flow distributor 100 moves in a circular path around the first gear 156, or the revolution axis T, and at the same time rotates around the rotation axis R1.

As a result, the flow component of the fluid medium induced by the rotation of the flow distributor wo around the rotation axis R1 may be superimposed with another flow component of the fluid medium induced by the movement M of the flow distributor 100. In FIG. 4, the circular movement M is shown in the direction parallel to the revolution direction of the first gear 156. Alternatively, the direction of the circular movement M relative to the revolution direction of the first gear 156 may be controlled by selectively driving the first gear 156, the second gear 158 and/or a gear ring (if applicable).

Figure 5:
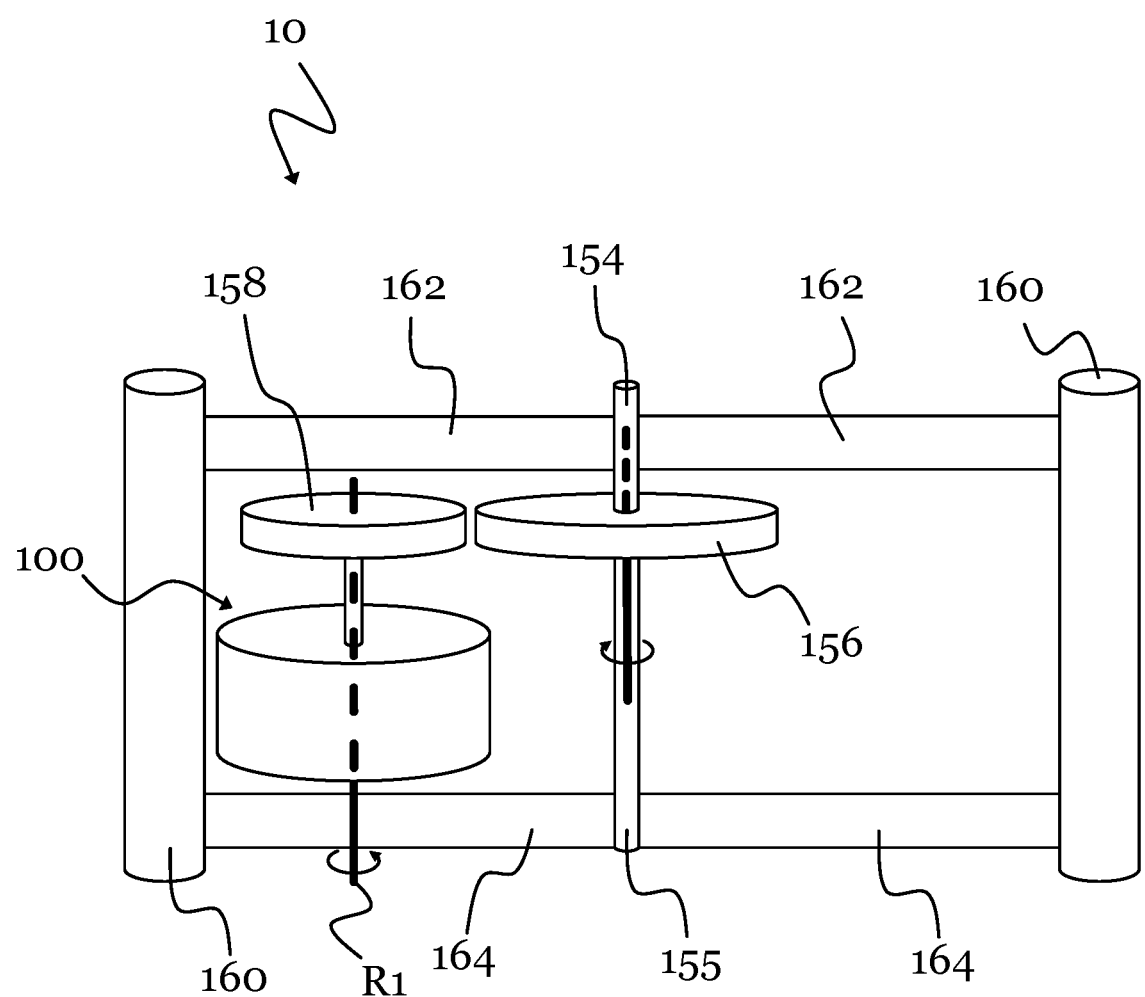
FIG. 5 is a schematic diagram of an apparatus according to an example.

FIG. 5 shows the apparatus 10 further comprising a vortex breaker 160 to disturb the formation of a static vortex. In the example of FIG. 5, a pair of vortex breakers 160 is provided as a pair of pillars having a circular cross section. In other examples, the vortex breakers may be provided as pillars having a different cross sectional shape (not shown), vanes, baffles or a combination thereof. Although two vortex breakers 160 are shown in FIG. 5, the number of the vortex breakers may vary. For example, a single vortex breaker may be provided, or three or more vortex breakers may be provided.

The vortex breakers 160 may be fixed to an extension portion 155 of the shaft 154 via connecting means 162, 164. In FIG. 5, an upper connecting means 162 connects an upper portion of the respective vortex breaker 160 the shaft 154, and a lower connecting means 164 connects a lower portion of the respective vortex breaker 160 with the shaft 154. In other examples, only one of the upper connecting means 162 and the lower connecting means 164 may be provided. Alternatively or additionally, at least one vortex breaker may be fixed to a shaft between the second gear 158 and the flow distributor 100. In such an example, the vortex breaker may be fixed such as to maintain its location radially outwards of the flow distributor 100 with respect to the revolution axis T.

The vortex breakers 160 are arranged to be rotatable with a rotation speed different from the rotation speed of the first gear 156 around the revolution axis T. Alternatively, the vortex breakers 160 are arranged to be non-rotatable during the operation of the apparatus 10. For example, any of the vortex breakers 160 may be coupled to a non-moving or movement-dampening element connected to the revolution shaft 154, such as via a bearing.

Figure 6:
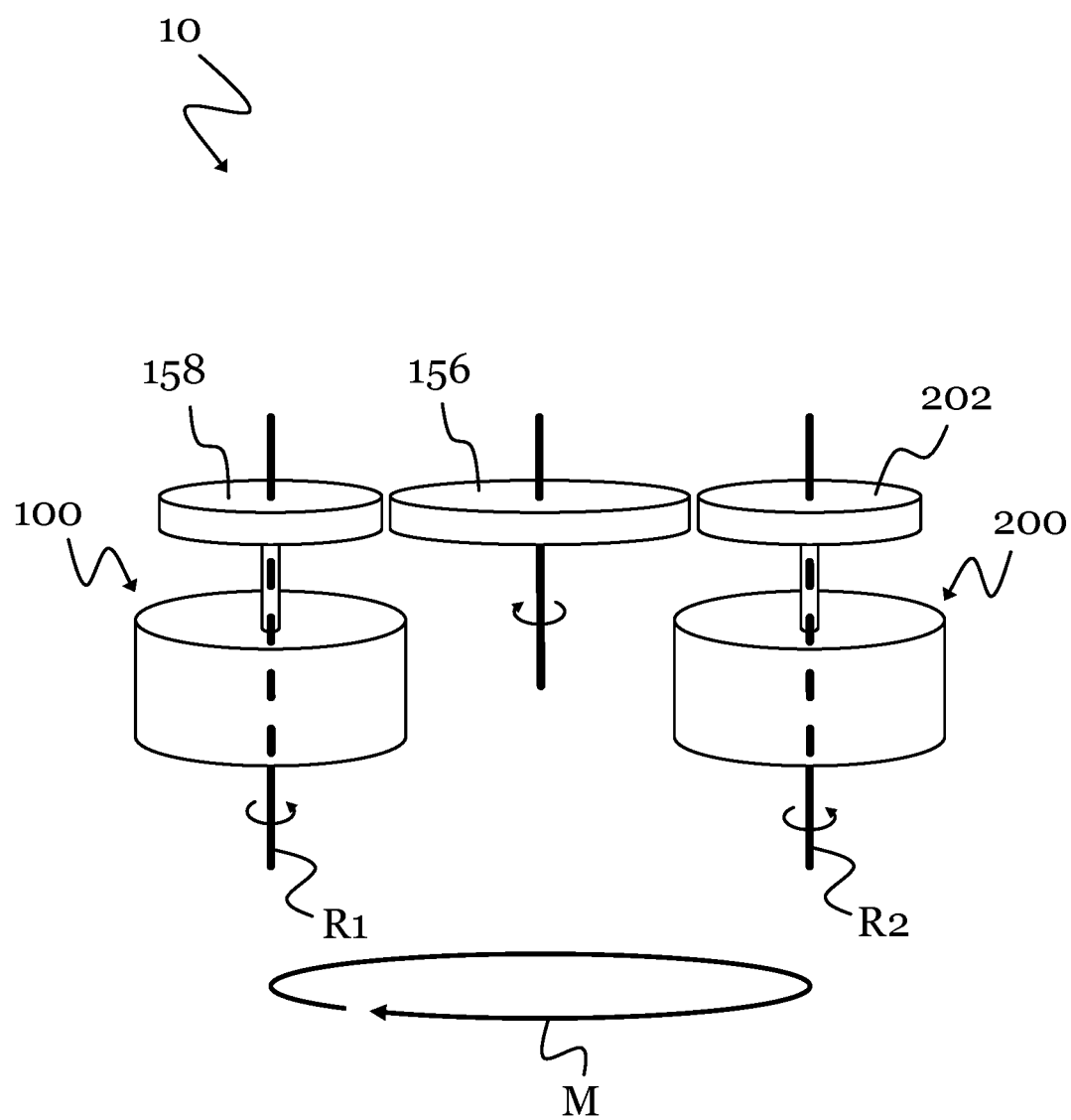
FIG. 6 is a schematic diagram of an apparatus according to an example.
Figure 7:
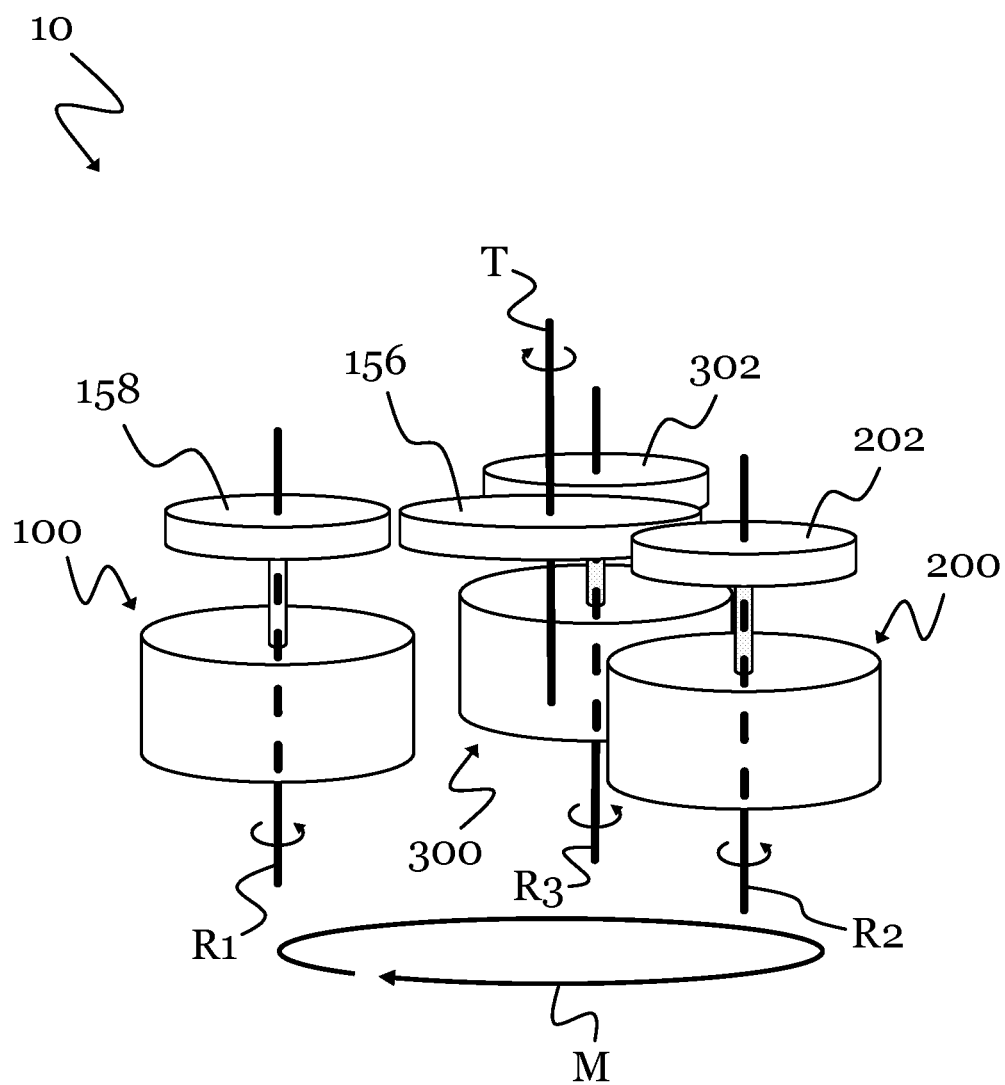
FIG. 7 is a schematic diagram of an apparatus according to an example.

FIGS. 6 and 7 illustrate examples of the apparatus 10 having two or three flow distributors. The flow distributor 100 as described with reference to FIGS. 1 to 5 may be referred to as a first flow distributor. A second flow distributor 200 and a third flow distributor 300 may each have the same or similar structural and functional features to the first flow distributor 100. The second flow distributor 200 may rotate around a second rotation axis R2 to generate a flow of the fluid medium through its peripheral surface. The third flow distributor 300 may rotate around a third rotation axis R3 to generate a flow of the fluid medium through its peripheral surface.

The flow distributors 100, 200, 300 are arranged such that their rotation axes R1, R2 and R3 are aligned parallel to one another. The flow distributors 100, 200, 300 may be driven and held in position by means of a planetary gear. The first gear 156 is referred to as the sun gear in terms of a planetary gear. The second gear 158 coupled with the first flow distributor 100 is referred to as the first planet gear.

The second flow distributor 200 is coupled to a second planet gear 202 meshing with the sun gear 156. The third flow distributor 300 is coupled to a third planet gear 302 meshing with the sun gear 156. The three planet gears 158, 202, 302 may be fixed to one another such as to maintain their position relative to one another, particularly in terms of the distances from one another. For example, the shafts between the planet gears 156, 202, 302 and the flow distributors 100, 200, 300, respectively, may have a respective extension portion extending in the axial direction, i.e. parallel to the rotation axes R1, R2 and R3, and connecting means may fixedly connect the extension portions with one another and/or to a gear carrier.

Alternatively or additionally, an outer gear ring may be provided (see FIG. 8) meshed with the planet gears 156, 202, 302 and thereby maintaining the planet gears 158, 202, 302 in positions relative to one another.

The sun gear 156 may be driven to rotate around the revolution axis T, and the planet gears 158, 202, 302 meshing with the sun gear 156 may be driven to roll around the sun gear 156 and the revolution axis T and thereby perform a rotation around the respective rotation axis R1, R2, R3. In other examples, the sun gear 156 may be arranged to be non-rotatable, and the planet gears 158, 202, 302 may be driven to move around the sun gear 158. Additionally, a gear ring may be driven to further transmit tangential forces to the planet gears 158, 202, 302.

The superimposition of the rotation of the flow distributors 100, 200, 300 around the respective rotation axes R1, R2, R3 and the movement of them along a common circular path around the revolution axis T may establish a force component pushing the solid reactant in the each of the flow distributors 100, 200, 300 off the respective peripheral surface in the above described manner.

Figure 8:
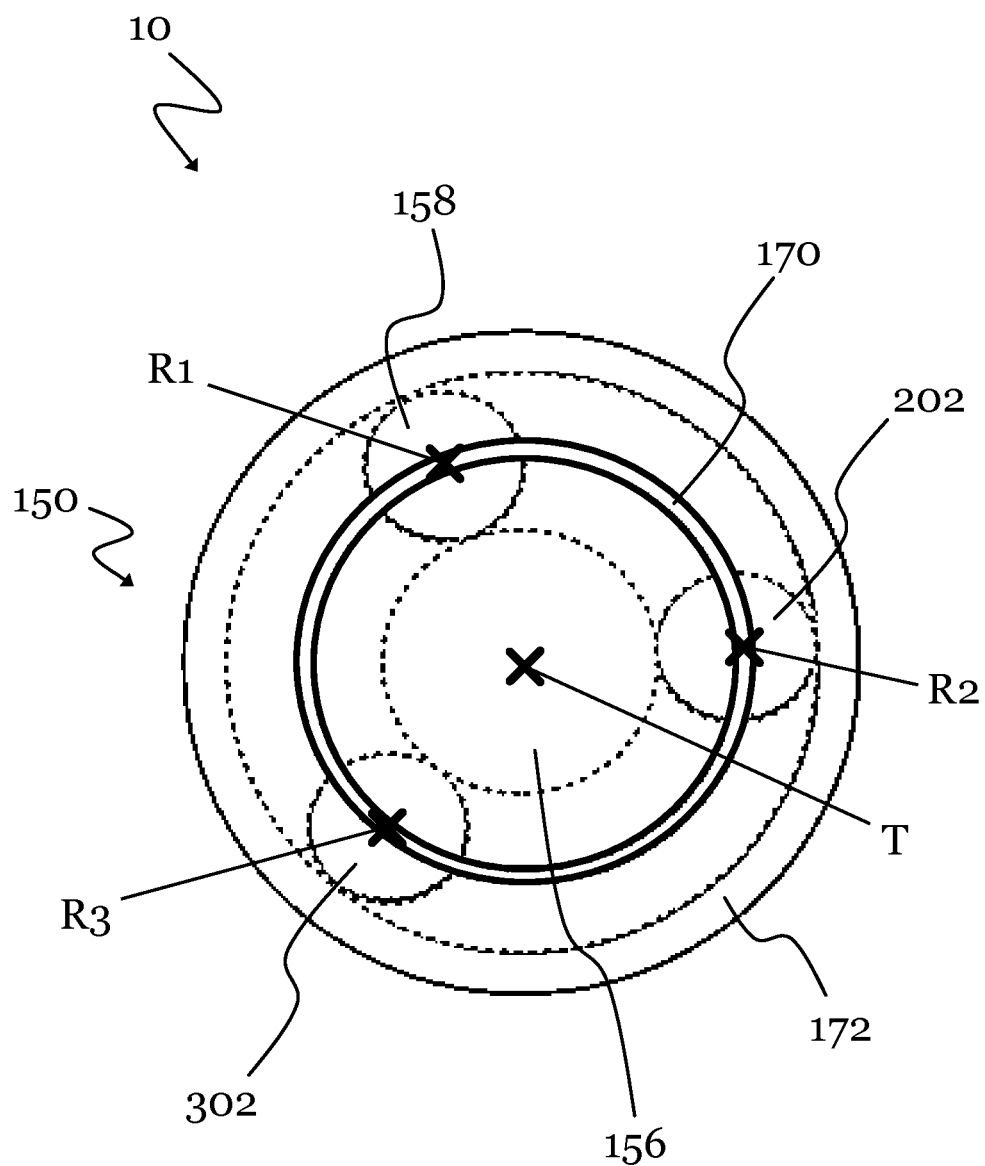
FIG. 8 is a schematic diagram of an apparatus in a plain view according to an example.

FIG. 8 shows an example of the apparatus 10. The drive unit 150 comprises a planetary gear, wherein the first gear 156 corresponds to a sun gear of the planetary gear, and the gears 158, 202, 302 correspond to planet gears of the planetary gear. The planetary gear further comprises a gear carrier 170 and a gear ring 172. In FIG. 8, a dashed line symbolizes a toothed lateral surface of the respective gear.

The gear carrier 170 is coupled to the planet gears 158, 202, 302 such that the arrangement of the planet gears 158, 202, 302 relative to one another is fixed. For example, the three planet gears 158, 202, 302 are arranged such to have a radial angular distance of 120°. The gear carrier 170 may be driven by an actuator to move the planet gears 158, 202, 302 in a synchronous manner and at a relatively fixed arrangement.

The gear ring 172 is arranged radially outside of the sun gear 156 and the planet gears 158, 202, 302 and engages with the planet gears 158, 202, 302. The gear ring 172 may be arranged to be non-rotatable or rotatable around the revolution axis T. If rotatable, the gear ring 172 may be driven to transmit tangential forces to the planet gears 158, 202, 302 and/or the sun gear 156.

The operation of the planetary gear may be as described above. In particular, only one of the sun gear 156, the gear carrier 170 and the gear ring 172 may be actively driven by an actuator. In other examples, two of the sun gear 156, the gear carrier 170 and the gear ring 172 may be actively driven by a common actuator or each by a respective actuator. In yet other examples, each of the three of the sun gear 156, the gear carrier 170 and the gear ring 172 may be actively driven by a common actuator, each by a respective actuator or by two separate actuators. The operation mode may be as known in the art of designing and constructing planetary gears.

Figure 9:
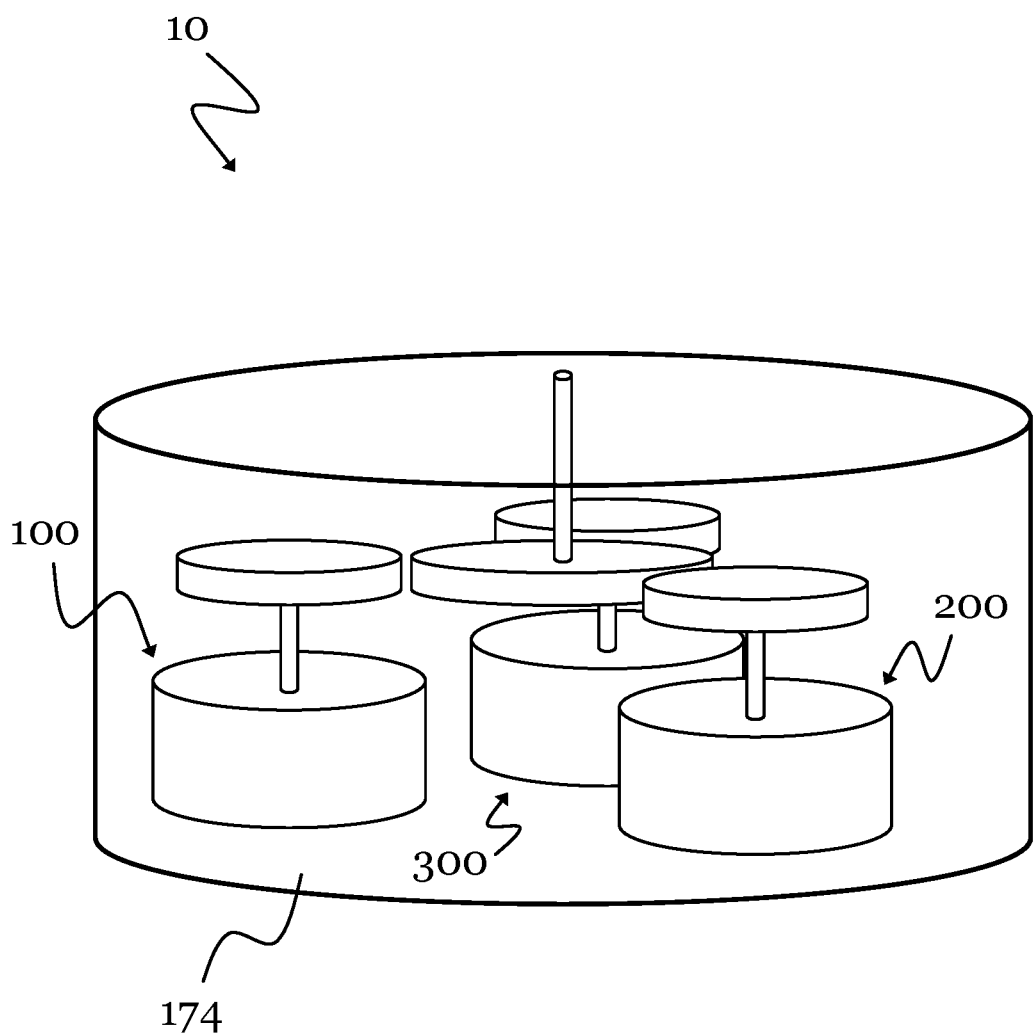
FIG. 9 is a schematic diagram of an apparatus according to an example.

FIG. 9 shows an example of the apparatus 10 further comprising a reactor vessel 174. The reactor vessel 174 may have a cylindrical inner volume to receive the flow distributors 100, 200, 300 and the drive unit 150 comprising the planetary gear 156, 158, 202, 302. Further, the fluid medium is loaded into the reactor vessel 174. The fluid medium may be a batch including the solid reactants. Alternatively, the solid reactants may be loaded into the inner volumes of the flow distributors 100, 200, 300 prior to submerging the latter in the fluid medium in the reactor vessel 174. The reactor vessel 174 may comprise an inlet for filling in the fluid medium and an outlet for discharging the reaction product.

LIST OF REFERENCE SIGNS

10 apparatus
100 flow distributor
110 top end surface
112 openings
120 bottom end surface
130 peripheral surface
132 openings
150 drive unit
151 rotation shaft
152 actuator
154 revolution shaft
155 extension portion
156 first gear, sun gear
158 second gear, planet gear
160 vortex breaker
162, 164 connecting means
170 gear carrier
172 gear ring
174 reactor vessel
200 flow distributor
202 planet gear
300 flow distributor
302 planet gear
M movement direction
R1, R2, R3 rotation axes
T revolution axis

What is claimed is:

1. An apparatus for promoting a mass transfer reaction between a fluid medium and a reactant, comprising:
 a flow distributor having a top end surface, a bottom end surface and a peripheral surface spanning between the top end surface and the bottom end surface, wherein the top end surface, the bottom end surface and the peripheral surface are axisymmetric with respect to a rotation axis, wherein the flow distributor is configured to submerge in a fluid medium and to generate a flow of the fluid medium through at least one of the top end surface and the bottom end surface, and through the peripheral surface by rotating around the rotation axis; and a single drive unit configured to,
rotate the flow distributor about the rotation axis so as to cause outward radial forces to act on a reactant within the flow distributor, and
move the flow distributor perpendicular to the rotation axis so as to cause inward counterforces to act on the reactant within the flow distributor or on said peripheral surface.

2. The apparatus of claim 1, wherein the single drive unit is configured to move the flow distributor such that the rotation axis of the flow distributor moves along a circular path.

3. The apparatus of claim 2, wherein the single drive unit comprises:
a first gear arranged around a revolution axis; and
a second gear engaging with the first gear, wherein the second gear is coupled to the flow distributor such to rotate the flow distributor around the rotation axis,
an actuator configured to drive the first gear and/or the second gear.

4. The apparatus of claim 3,
wherein the actuator is a first actuator to drive the first gear to rotate around the revolution axis,
wherein the single drive unit further comprises a second actuator to drive the second gear to rotate around the rotation axis.

5. The apparatus of claim 3, wherein the single drive unit comprises a planetary gear, in which the first gear is arranged as a sun gear of the planetary gear, and the second gear is arranged as a planet gear of the planetary gear.

6. The apparatus of claim 1, wherein the flow distributor is a first flow distributor, and the rotation axis of the first flow distributor is a first rotation axis, the apparatus further comprising:
a second flow distributor configured to rotate around a second rotation axis, the second flow distributor having a top end surface, a bottom end surface and a peripheral surface, wherein the top end surface, the bottom end surface and the peripheral surface of the second flow distributor are axisymmetric with respect to the second rotation axis,
wherein the second flow distributor is arranged such that the second rotation axis is distanced from and parallel to the first rotation axis,
wherein the single drive unit is further configured to move the second flow distributor perpendicular to the second rotation axis.

7. The apparatus of claim 6, wherein the single drive unit is configured to move the first flow distributor and the second flow distributor along a common circular path.

8. The apparatus of claim 1, further comprising:
a vortex breaker coupled to the single drive unit and arranged radially outwards from the flow distributor with respect to the rotation axes.

9. The apparatus of claim 1, further comprising:
a reactor vessel configured to contain a fluid medium and a reactant and to receive the flow distributor.

10. An apparatus for promoting a mass transfer reaction between a fluid medium and a reactant, comprising:
two flow distributors,
wherein the two flow distributors each have a top end surface, a bottom end surface and a peripheral surface that are axisymmetric with respect to a respective rotation axis of the two flow distributors,
wherein each of the two flow distributors is configured to submerge in a fluid medium and to generate a flow of the fluid medium through at least one of the respective top end surface and the respective bottom end surface and through the respective peripheral surface by rotating around the respective rotation axis,
wherein the two flow distributors are arranged so that the rotation axes are parallel to one another; and
a single drive unit configured to,
rotate the two flow distributors about the respective rotation axes so that outward radial forces act on a reactant within each respective flow distributor, and
move the two flow distributors perpendicular to the respective rotation axis so that inward counterforces act on the reactant within each respective flow distributor or on each respective flow distributor's peripheral surface.

11. The apparatus of claim 10, wherein the two flow distributors are a first flow distributor and a second flow distributor, the apparatus further comprising:
a first gear arranged around a revolution axis;
a second gear coupled to the first flow distributor so as to rotate the first flow distributor around its rotation axis; and
a third gear coupled to the second flow distributor so as to rotate the second flow distributor,
wherein the second gear and the third gear each engages with the first gear such to transfer torque.

12. The apparatus of claim 11, wherein the single drive unit comprises a planetary gear, in which the first gear is arranged as a sun gear of the planetary gear, the second gear is arranged as a first planet gear of the planetary gear, and the third gear is arranged as a second planet gear of the planetary gear.

13. An apparatus for promoting a mass transfer reaction between a fluid medium and a reactant, comprising:
at least three flow distributors,
wherein each of the at least three flow distributors has a top end surface, a bottom end surface and a peripheral surface,
wherein the top end surface, the bottom end surface and the peripheral surface of each of the at least three flow distributors are axisymmetric with respect to a respective rotation axis,
wherein each of the at least three flow distributors is configured to submerge in a fluid medium and to generate a flow of the fluid medium through at least one of the respective top end surface and the respective bottom end surface and through the respective peripheral surface by rotating around the respective rotation axis,
wherein the at least three flow distributors are arranged so that the rotation axes are parallel to one another; and
a single drive unit configured to,
rotate the three flow distributors about the respective axes so that outward radial forces act on a reactant within each respective flow distributor, and
move the at least three flow distributors perpendicular to the respective rotation axis so that inward counterforces act on the reactant within each respective flow distributor or on each respective flow distributor's peripheral surface.

14. The apparatus of claim 13, wherein the single drive unit is configured to move the at least three flow distributors along a common circular path perpendicular to the respective rotation axis by means of a planetary gear coupled to each of the at least three flow distributors.

15. A method for promoting a mass transfer reaction, comprising:
- providing a flow distributor having a top end surface, a bottom end surface and a peripheral surface spanning between the top end surface and the bottom end surface, wherein the top end surface, the bottom end surface and the peripheral surface are axisymmetric with respect to a rotation axis, wherein the flow distributor is configured to submerge in a fluid medium and to generate a flow of the fluid medium through at least one of the top end surface and the bottom end surface and through the peripheral surface by rotating around the rotation axis;
- loading a reactor vessel with a fluid medium;
- loading the flow distributor with a reactant;
- inserting the flow distributor in the reactor vessel;
- rotating the flow distributor around the rotation axis;
- moving the flow distributor perpendicular to the rotation axis.

16. The method of claim 15, wherein the flow distributor is moved along a circular path perpendicular to the rotation axis in addition to the rotation of the flow distributor around the rotation axis.

17. The method of claim 15, further comprising:
- moving the flow distributor perpendicular to the rotation axis by means of a planetary gear.

18. The method of claim 15, wherein the flow distributor is a first flow distributor and the rotation axis of the first flow distributor is a first rotation axis, the method further comprising:
- providing a second flow distributor configured to rotate around a second rotation axis, the second flow distributor having a top end surface, a bottom end surface and a peripheral surface, wherein the top end surface, the bottom end surface and the peripheral surface of the second flow distributor are axisymmetric with respect to the second rotation axis,
- wherein the second flow distributor is arranged such that the second rotation axis is distanced from and parallel to the first rotation axis;
- moving the first flow distributor and the second flow distributor along a common circular path.

19. The method of claim 18, further comprising:
- loading the second flow distributor with a material that is different from the reactant the first flow distributor is loaded with.

* * * * *